(12) United States Patent
Naiyang et al.

(10) Patent No.: US 10,708,499 B2
(45) Date of Patent: *Jul. 7, 2020

(54) METHOD AND APPARATUS HAVING A FUNCTION OF CONSTANT AUTOMATIC FOCUSING WHEN EXPOSURE CHANGES

(71) Applicant: ArcSoft Corporation Limited, Hangzhou, Zhejiang (CN)

(72) Inventors: Lin Naiyang, Hangzhou (CN); Xi Wenxing, Hangzhou (CN)

(73) Assignee: ArcSoft Corporation Limited, Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/020,149

(22) Filed: Jun. 27, 2018

(65) Prior Publication Data

US 2018/0376064 A1   Dec. 27, 2018

(30) Foreign Application Priority Data

Jun. 27, 2017   (CN) .......................... 2017 1 0500636

(51) Int. Cl.
*H04N 5/232* (2006.01)
*G03B 13/36* (2006.01)
(Continued)

(52) U.S. Cl.
CPC ........... *H04N 5/23245* (2013.01); *G03B 7/17* (2015.01); *G03B 13/36* (2013.01); *H04N 5/2353* (2013.01);
(Continued)

(58) Field of Classification Search
CPC ............. H04N 5/23245; H04N 5/2354; H04N 5/23253; H04N 5/23212; H04N 9/045;
(Continued)

(56) References Cited

U.S. PATENT DOCUMENTS 8,786,762 B2   7/2014  Ito
9,002,061 B2 *  4/2015  Hashimoto ............... G06T 9/00
                                                            382/103
(Continued)

FOREIGN PATENT DOCUMENTS

CN   102169276 A   8/2011

OTHER PUBLICATIONS

Copending U.S. Appl. No. 16/020,113, Inventors: Naiyang et al., filed Jun. 27, 2018.*

*Primary Examiner* — Luong T Nguyen
(74) *Attorney, Agent, or Firm* — Osha Liang LLP (57) ABSTRACT

The present invention provides a method and an apparatus for focusing, applied in image processing field, which includes determining that imaging mode switches from a first imaging mode to a second imaging mode, making luminance adjustment to a first feature template of target object in the first imaging mode to obtain a second feature template, searching for an image of the target object according to the second feature template in the second imaging mode. The method enables a terminal in an automatic focusing process to realize a function of constant automatic focusing, and to make user interaction decreases and focus on the target object in time, accurately and efficiently to output constant satisfactory images or videos.

11 Claims, 6 Drawing Sheets

(51) Int. Cl.
*H04N 5/235* (2006.01)
*H04N 9/04* (2006.01)
*G03B 7/17* (2014.01)

(52) U.S. Cl.
CPC ....... *H04N 5/2354* (2013.01); *H04N 5/23212* (2013.01); *H04N 9/045* (2013.01)

(58) Field of Classification Search
CPC . G03B 13/36; G03B 3/10; G03B 7/17; G02B 7/36
See application file for complete search history.

(56) References Cited

U.S. PATENT DOCUMENTS

| | | |
|---|---|---|
| 2011/0187869 A1* | 8/2011 | Kokubun ............... H04N 5/225 348/169 |
| 2011/0205403 A1 | 8/2011 | Ito |
| 2015/0015774 A1* | 1/2015 | Sugie ................... H04N 5/2353 348/364 |
| 2015/0156408 A1* | 6/2015 | Yoshida ............. H04N 5/23216 348/362 |

* cited by examiner

METHOD AND APPARATUS HAVING A FUNCTION OF CONSTANT AUTOMATIC FOCUSING WHEN EXPOSURE CHANGES

CROSS-REFERENCE TO RELATED APPLICATIONS

This application claims priority to Chinese Patent Application No. 201710500636.6, filed on Jun. 27, 2017, which is hereby incorporated by reference in its entirety.

TECHNICAL FIELD

The present invention relates to image processing field, and in particular, to a method and apparatus for focusing.

BACKGROUND

In recent years, with the rapid development of electronic technology, picture taking function of various devices is more and more powerful, which is not only more and more, and more and more powerful, such as: increasing image pixels, advancing the self-timer function, larger aperture, enhanced optical anti-shake function, accelerating the speed of focus, automatic focus, and various manually operating professional mode.

Many of the existing terminals, such as smart phones, are equipped with a picture taking device such as a camera. The picture taking device of many of the terminals has automatic focus function. Automatic focus is that when the target object is selected, the picture taking device can continue to focus on the target object, so that the target object in the output image remains clear. Even if the terminal with the picture taking device moves, the focusing area always includes the target object to achieve the goal of the automatic focus.

The picture taking device of some terminals supports automatic focus function, but when exposure changes, such as flashlight on or off, the automatic focus function suspends, so that user interaction increases and constant satisfactory images or videos will not be output.

SUMMARY

The present invention provides a method and apparatus for focusing, enables a terminal in an automatic focusing process not to suspend automatic focus function to realize a function of constant automatic focusing when exposure changes, and to increase adaptability to various picture taking mode for a picture taking device.

According to a first aspect of the present invention, a method for focusing is provided, and the method includes:

determining that imaging mode switches from a first imaging mode to a second imaging mode, wherein exposure in the first imaging mode is different from exposure in the second imaging mode;

making luminance adjustment to a first feature template of target object in the first imaging mode according to luminance information of an image of the target object in the first imaging mode and luminance information of an image of the target object in the second imaging mode to obtain a second feature template;

searching for an image of the target object according to the second feature template in the second imaging mode.

According to a second aspect of the present invention, a method for focusing is provided, comprising:

determining that imaging mode switches from a third imaging mode to a fourth imaging mode, wherein the third imaging mode comprises a mode in which a non-depth camera is used to take a picture, and the fourth imaging mode comprises a mode in which a depth camera is used to take a picture;

creating a third feature template, wherein the third feature template is used to record depth information of a target object;

searching for an image of the target object according to the third feature template in the fourth imaging mode.

According to a third aspect of the present invention, an apparatus for focusing is provided, wherein the apparatus comprises:

a first determining module, configured to determine that imaging mode switches from a first imaging mode to a second imaging mode, wherein exposure in the first imaging mode is different from exposure in the second imaging mode;

a first luminance adjusting module, configured to make luminance adjustment to a first feature template of target object in the first imaging mode according to luminance information of an image of the target object in the first imaging mode and luminance information of an image of the target object in the second imaging mode to obtain a second feature template; and a first searching module, configured to search for an image of the target object according to the second feature template in the second imaging mode.

According to a fourth aspect of the present invention, a computer-readable medium is provided, where the computer-readable medium stores computer instructions that, when executed by a processor, cause the processor to perform steps of any of a first aspect of the present invention and any of a first to a ninth implementing way of the first aspect of the present invention.

According to a fifth aspect of the present invention, an apparatus for focusing is provided, comprising a storage, a processor and computer instructions stored in the storage and executed by the processor, wherein the computer instructions are executed by the processor to perform steps of any of a first aspect of the present invention and any of a first to a ninth implementing way of the first aspect of the present invention.

According to a sixth aspect of the present invention, an apparatus for focusing is provided, comprising:

a second determining module, configured to determine that imaging mode switches from a third imaging mode to a fourth imaging mode, wherein the third imaging mode comprises a mode in which a non-depth camera is used to take a picture, and the fourth imaging mode comprises a mode in which a depth camera is used to take a picture;

a template creating module, configured to create a third feature template, wherein the third feature template is used to record depth information of a target object; and a second searching module, configured to search for an image of the target object according to the third feature template in the fourth imaging mode.

According to a seventh aspect of the present invention, a computer-readable medium is provided, where the computer-readable medium stores computer instructions that, when executed by a processor, cause the processor to perform steps of the second aspect of the present invention and any of the first to eleventh implementing ways of the second aspect of the present invention.

The eighth aspect of the present invention provides an apparatus for focusing, including a storage, a processor and computer instructions stored in the storage and executed by the processor, wherein the computer instructions are executed by the processor to perform steps of any of the second aspect of the present invention and the first to eleventh implementing ways of the second aspect of the present invention.

The method for focusing provided in the present invention, enables a terminal in an automatic focusing process not to suspend automatic focus function to realize a function of constant automatic focusing when exposure changes, and to increase adaptability to various picture taking mode for a picture taking device to make user interaction decreases and focus on the target object in time, accurately and efficiently to output constant satisfactory images or videos.

DESCRIPTION OF EMBODIMENTS

The following specifically describes the technical solution in the embodiments of the present invention with reference to the accompanying draws in the embodiments of the present invention.

The terms "a first", "a second", etc. in the claims, embodiments and figures is used to distinguish different objects and not to limit particular order The term "and/or" is used to describe relationship of related objects, which includes three relationships. For example, A and/or B can describe: A only, A and B, and B only.

In the embodiments of the present invention, the word "exemplary" or "for example" is used to make an example, evidence or explanation. The embodiments or solution described as "exemplary" or "for example" in the embodiments should not be interpreted as better or having more advantage than other embodiments or solution. Precisely, the word "exemplary" or "for example" is used to give a conception in detailed way.

What to be explained is, for conciseness and clarity of the diagram, that the elements in the figures are not necessary to be drawn according to a proportion. For example, for clarity, a size of some elements can be enlarged compared to other elements. Besides, some reference of figures can be repeated among figures in an appropriate place to illustrate corresponding or similar elements.

What to be explained is that because video is constituted by several pictures, the processing method on pictures or images or photos described in the embodiments of the present invention can be applied in videos, and a person skilled in the art can amend the solution disclosed in the present invention to a method applied in video processing without inventive efforts. The amended method should fall in the protection scope of the present invention.

Figure 1:
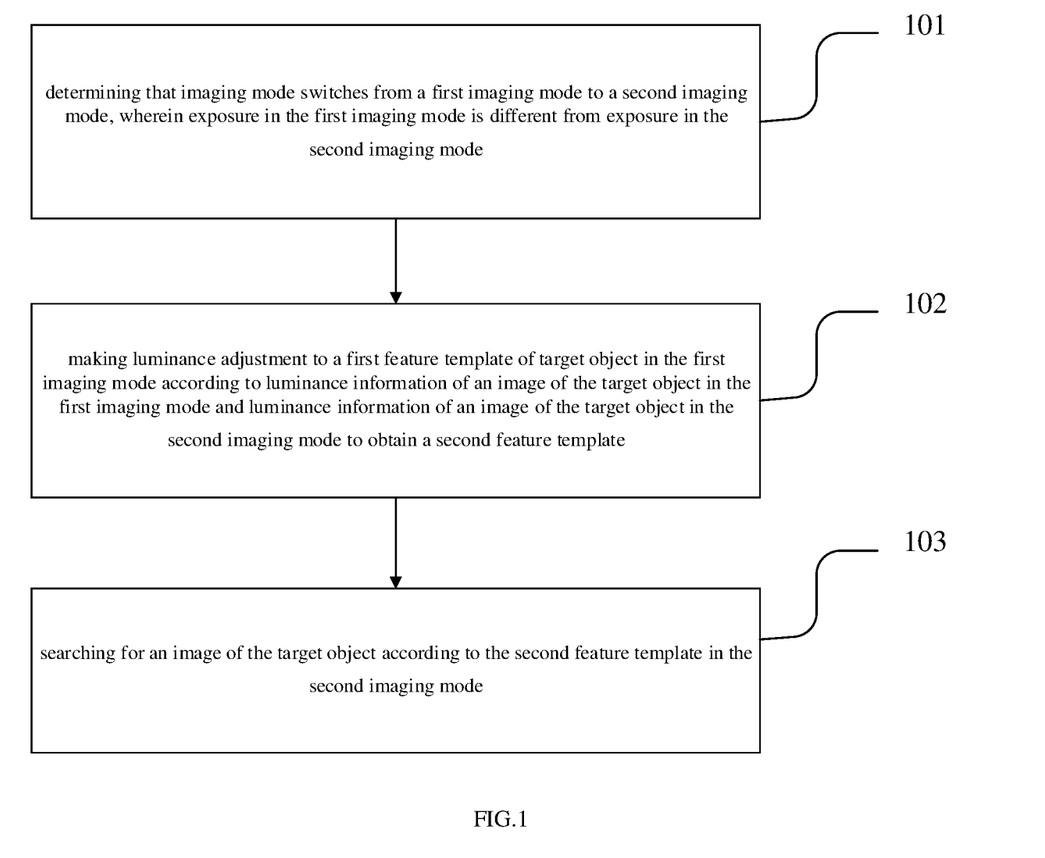
FIG. 1 is a flowchart of a method for focusing provided by the first embodiment of the present invention.

The following, referring to FIG. 1, is to illustrate the first embodiment of the present invention. As shown in FIG. 1, the method may be applied in situation when exposure changes, and includes:

Step 101, determining that imaging mode switches from a first imaging mode to a second imaging mode, wherein exposure in the first imaging mode is different from exposure in the second imaging mode;

Optionally, the imaging mode switches from a first imaging mode to a second imaging mode may include flashlight on or off, or external light conditions change. Besides, the situation that affects exposure may include other situation in which quantity of light which illuminates light sensor through lens is affected.

Optionally, when the first imaging mode is that a color picture taking device takes a picture and the second imaging mode is that a black-white picture taking device takes a picture, or the first imaging mode is that a black-white picture taking device takes a picture or the second imaging mode is that a color picture taking device takes a picture.

Step 102, making illumination (luminance) adjustment to a first feature template of target object in the first imaging mode according to illumination (luminance) information of an image of the target object in the first imaging mode and luminance information of an image of the target object in the second imaging mode to obtain a second feature template. Specifically, when exposure changes, for example when flashlight on, the image area of the target object after exposure changes is compared to that before exposure changes, relative feature of the tracking template is adjusted to adapt to new light conditions. The luminance information of the image of the target object in the second imaging mode may be determined by using stereoscopic vision to roughly estimate the position of the target object in the second imaging mode and obtaining its luminance information, or by using the luminance information of the entire image.

The image of the target object may be an image of a part of the target object, or that of the whole target object.

The feature template may be one or more, the feature template stores information, such as color information, shape information, texture information, etc.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, according to the luminance information, count the statistics information of light intensity of the image of the target object in the first imaging mode and statistics information of light intensity of the image of the target object in the second imaging mode, noted as $\{H_i^0, i=0 \ldots 255\}$, $\{H_i^1, i=0 \ldots 255\}$.

Optionally, the making luminance adjustment to the first feature template of target object in the first imaging mode according to luminance information of the image of the target object in the first imaging mode and luminance information of the image of the target object in the second imaging mode to obtain the second feature template comprises:

making luminance adjustment to the first feature template of target object in the first imaging mode to obtain the second feature template according to following information:

statistics information of light intensity of pixels of the image of the target object in the first imaging mode and statistics information of light intensity of pixels of the image of the target object in the second imaging mode.

Optionally, the making luminance adjustment to the first feature template of target object in the first imaging mode to obtain the second feature template according to following information: statistics information of light intensity of pixels of the image of the target object in the first imaging mode and statistics information of light intensity of pixels of the image of the target object in the second imaging mode comprises:

determining corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as or similar to the statistics information of light intensity of pixels of the image of the target object in the first imaging mode;

making luminance adjustment to the first feature template according to corresponding relationship between the light intensity of pixels of the image of the target object in the first imaging mode and light intensity of pixels of the image of the target object in the first imaging mode to which the luminance adjustment is made to obtain the second feature template.

Optionally, the determining the corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as the statistics information of light intensity of pixels of the image of the target object in the first imaging mode comprises:

determining the corresponding relationship between the light intensity of pixels of the image of the target object in the first imaging mode and light intensity of pixels of the image of the target object in the first imaging mode to which the luminance adjustment is made according to following information:

a mean value of light intensity of pixels of the image of the target object in the first imaging mode and a mean value of light intensity of pixels of the image of the target object in the second imaging mode, and variance of light intensity of pixels of the image of the target object in the first imaging mode and variance of light intensity of pixels of the image of the target object in the second imaging mode; and, wherein the mean value of light intensity of pixels of the image of the target object in the first imaging mode to which the luminance adjustment is made is the same as or similar to the mean value of light intensity of pixels of the image of the target object in the first imaging mode, and variance of light intensity of pixels of the image of the target object in the first imaging mode to which the luminance adjustment is made is the same as or similar to the variance of light intensity of pixels of the image of the target object in the first imaging mode.

Optionally, the mean value may be a weighted mean value, and variance may be weighted variance. A person skilled in the art should understand, for different scenarios, the mean value and variance may be replaced by a variation of the calculating method of the present invention which does not need an inventive effort of a person skilled in the art, and falls into the protection scope of the present invention.

Optionally, the determining corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode comprises:

determining, according to statistics information of light intensity of pixels of the image of the target object in the first imaging mode and statistics information of light intensity of pixels of the image of the target object in the second imaging mode, the light intensity T[i] of pixels of the image of the target object in the first imaging mode to which the luminance adjustment is made:

$$T[i] = (i - M_0) * \frac{V_1}{V_0} + M_1;$$

Wherein $M_0$ is a mean value of light intensity of pixels of the image of the target object in the first imaging mode, $M_1$ is a mean value of light intensity of pixels of the image of the target object in the second imaging mode, $V_0$ is variance of light intensity of pixels of the image of the target object in the first imaging mode, $V_1$ is variance of light intensity of pixels of the image of the target object in the second imaging mode, i is light intensity of pixels of the image of the target object in the first imaging mode.

Optionally, the making luminance adjustment to the first feature template according to the corresponding relationship between the light intensity of pixels of the image of the target object in the first imaging mode and light intensity of pixels of the image of the target object in the first imaging mode to which the luminance adjustment is made to obtain the second feature template comprises:

obtaining, according to the corresponding relationship between the light intensity of pixels of the image of the target object in the first imaging mode and light intensity of pixels of the image of the target object in the first imaging mode to which the luminance adjustment is made, light intensity L'(x, y) of pixels of the second feature template:

$$L'(x,y)=T[L(x,y)]$$

wherein L(x, y) is light intensity of pixels of the first feature template, T[i] is light intensity of pixels of the image of the target object in the first imaging mode to which the luminance adjustment is made, i is light intensity of pixels of the image of the target object in the first imaging mode.

Optionally, the corresponding relationship may be presented by a mapping table, that is the mapping relationship of i and T[i]. The corresponding T[L(x, y)] can be found according to the light intensity L(x, y) of pixels of the first feature template and the mapping relationship, i.e. is the light intensity adjusted of pixels of the first feature template, which is light intensity L'(x, y) of pixels of the second feature template.

Thus, the second feature template not only maintains the original structure of the previous template, but also adapts new light conditions.

Optionally, the light intensity of pixels comprises a value of L channel of the image in Lab format, or a value of Y channel of the image in YUV format.

Optionally, the searching for the image of the target object according to the second feature template in the second imaging mode comprises:

increasing a confidence in a search result for the target object from an illumination-independent feature template in the second feature template, and/or, decreasing a confidence in a search result for the target object from an illumination-dependent feature template in the second feature template.

Specifically, in the process of searching for the image of the target object, the searching result is needed to be evaluated to judge if the current searching result can be trusted. It is judged that whether the current searching result is right by giving different weights to different feature templates (such as texture, color, gradient, intensity, etc.). The feature template irrelative to luminance may include gradient feature template, texture feature template, etc. The feature template relative to luminance may include color feature template, intensity feature template, etc. The method for increasing confidence level and decreasing confidence level may be realized by adjusting the weights of their confidence level, or by giving different thresholds to control confidence level of searching result for different feature templates.

Step 103, searching for an image of the target object according to the second feature template in the second imaging mode.

Optionally, the method further includes:

searching for the image of the target object by using the first feature template after a period of time. The period of time can be set, such as 3 seconds or 5 seconds, or set by an adaptive way by examining the exposure. For example, in a scenario of flashlight on or off, it may be set by 3 seconds. Within the period of time the second feature template is used to search for the image of the target object, and after the period of time the exposure like light conditions may become the original situation. If the exposure like light conditions may become the original situation, the first feature template may be still used to search for the image of the target object.

The above method enables a terminal in an automatic focusing process not to suspend automatic focus function to realize a function of constant automatic focusing when exposure changes, and to increase adaptability to various picture taking mode for a picture taking device to make user interaction decreases and focus on the target object in time, accurately and efficiently to output constant satisfactory images or videos.

Figure 2:
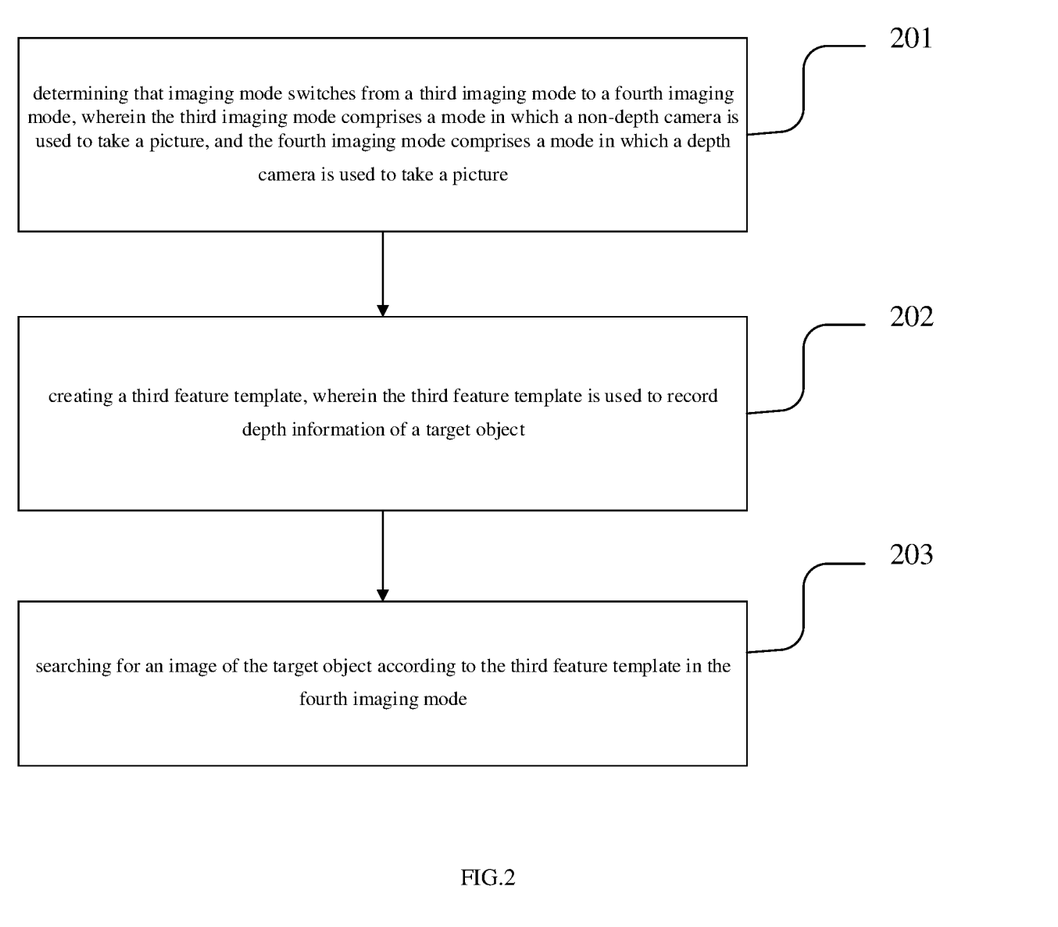
FIG. 2 is a flowchart of another method for focusing provided by the second embodiment of the present invention.

The following, referring to FIG. 2, is to illustrate a method for focusing provided by the second embodiment of the present invention. The method may be applied in the switch of dual-camera picture taking device including depth camera and non-depth camera, or in the switch of picture taking mode of the picture taking device including depth picture taking mode and non-depth picture taking mode. This embodiment of the present invention may be applied in a scenario of a switch from the non-depth camera to the depth camera, or switch from the non-depth camera to the depth camera and back to the non-depth camera.

Step 201, determining that imaging mode switches from a third imaging mode to a fourth imaging mode, wherein the third imaging mode comprises a mode in which a non-depth camera is used to take a picture, and the fourth imaging mode comprises a mode in which a depth camera is used to take a picture. The output image in the third imaging mode may be a grey-scale map or a color map.

Step 202, creating a third feature template, wherein the third feature template is used to record depth information of a target object. Optionally, the third feature template is further used to record shape information of the target object. The feature template may be one or more, the feature template stores information, such as color information, shape information, texture information, etc.

Step 203, searching for an image of the target object according to the third feature template in the fourth imaging mode.

Optionally, the searching for the image of the target object according to the third feature template in the fourth imaging mode comprises: determining that the distance in depth between the target object and the background is more than or equal to a first threshold, and searching for the image of the target object according to the depth information of the target object. The first threshold may be pre-set. The image of the target object may be an image of a part of the target object, or that of the whole target object.

Optionally, the searching for the image of the target object according to the depth information of the target object comprises: searching for the image of the target object according to a first algorithm, wherein the first algorithm comprises: front background segmentation algorithm or Mean Shift algorithm.

Optionally, before determining that the imaging mode switches from the third imaging mode to the fourth imaging mode, the method further comprises:

searching for the image of the target object by using a fourth feature template in the third imaging mode;

after searching for the image of the target object according to the third feature template in the fourth imaging mode, the method further comprises:

determining that the imaging mode switches from a fourth imaging mode to a fifth imaging mode, wherein the exposure in the fifth imaging mode is different from the exposure in the third imaging mode, and the fifth imaging mode and the third imaging mode are the modes of the same camera's; When there is only one picture taking device, and the picture taking device has depth picture taking mode and non-depth picture taking mode, the fifth imaging mode is the same as the third imaging mode, and both may be non-depth picture taking mode.

making luminance adjustment to the fourth feature template to obtain a fifth feature template, and searching for the image of the target object by using the fifth feature template in the fifth imaging mode.

Optionally, the making luminance adjustment to the fourth feature template to obtain the fifth feature template comprises:

making, according to luminance information of the image of the target object in the third imaging mode and luminance information of the image of the target object in the fifth imaging mode, luminance adjustment to the fourth feature template to obtain the fifth feature template.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, according to the luminance information, count the statistics information of light intensity of the image of the target object in the first imaging mode and statistics information of light intensity of the image of the target object in the second imaging mode, noted as $\{H_i^0, i=0 \ldots 255\}$, $\{H_i^1, i=0 \ldots 255\}$.

Optionally, the making, according to luminance information of the image of the target object in the third imaging mode and luminance information of the image of the target object in the fifth imaging mode, luminance adjustment to the fourth feature template to obtain the fifth feature template comprises:

making luminance adjustment to the fourth feature template to obtain the fifth feature template according to the following information:

statistics information of light intensity of pixels of the image of the target object in the third imaging mode and statistics information of light intensity of pixels of the image of the target object in the fifth imaging mode.

Optionally, the making luminance adjustment to the fourth feature template to obtain the fifth feature template according to the following information: statistics information of light intensity of pixels of the image of the target object in the third imaging mode and statistics information of light intensity of pixels of the image of the target object in the fifth imaging mode comprises:

determining corresponding relationship between light intensity of pixels of the image of the target object in the third imaging mode and light intensity of pixels of the image of the target object in the fifth imaging mode to which the luminance adjustment is made according to statistics information of light intensity of pixels of the image of the target object in the third imaging mode and statistics information of light intensity of pixels of the image of the target object in the fifth imaging mode, wherein statistics information of light intensity of pixels of the image of the target object in the fifth imaging mode to which the luminance adjustment is made is the same as or similar to statistics information of light intensity of pixels of the image of the target object in the third imaging mode;

making luminance adjustment to the fourth feature template to obtain the fifth feature template according to corresponding relationship between light intensity of pixels of the image of the target object in the third imaging mode and light intensity of pixels of the image of the target object in the fifth imaging mode to which the luminance adjustment is made.

Optionally, the determining corresponding relationship between light intensity of pixels of the image of the target object in the third imaging mode and light intensity of pixels of the image of the target object in the fifth imaging mode to which the luminance adjustment is made according to statistics information of light intensity of pixels of the image of the target object in the third imaging mode and statistics information of light intensity of pixels of the image of the target object in the fifth imaging mode, wherein statistics information of light intensity of pixels of the image of the target object in the fifth imaging mode to which the luminance adjustment is made is the same as statistics information of light intensity of pixels of the image of the target object in the third imaging mode comprises:

determining corresponding relationship between light intensity of pixels of the image of the target object in the third imaging mode and light intensity of pixels of the image of the target object in the fifth imaging mode to which the luminance adjustment is made according to the following information:

a mean value of light intensity of pixels of the image of the target object in the third imaging mode and a mean value of light intensity of pixels of the image of the target object in the fifth imaging mode, and variance of light intensity of pixels of the image of the target object in the third imaging mode and variance of light intensity of pixels of the image of the target object in the fifth imaging mode; and wherein the mean value of light intensity of pixels of the image of the target object in the fifth imaging mode to which the luminance adjustment is made is the same as or similar to the mean value of light intensity of pixels of the image of the target object in the third imaging mode, and variance of light intensity of pixels of the image of the target object in the fifth imaging mode to which the luminance adjustment is made is the same as or similar to the variance of light intensity of pixels of the image of the target object in the third imaging mode.

Optionally, the mean value may be a weighted mean value, and variance may be weighted variance. A person skilled in the art should understand, for different scenarios, the mean value and variance may be replaced by a variation of the calculating method of the present invention which does not need an inventive effort of a person skilled in the art, and falls into the protection scope of the present invention.

Optionally, the determining corresponding relationship between light intensity of pixels of the image of the target object in the third imaging mode and light intensity of pixels of the image of the target object in the fifth imaging mode to which the luminance adjustment is made according to statistics information of light intensity of pixels of the image of the target object in the third imaging mode and statistics information of light intensity of pixels of the image of the target object in the fifth imaging mode comprises:

determining, according to statistics information of light intensity of pixels of the image of the target object in the third imaging mode and statistics information of light intensity of pixels of the image of the target object in the fifth imaging mode, the light intensity $D[i]$ of pixels of the image of the target object in the fifth imaging mode to which the luminance adjustment is made:

$$D[i] = (i - M_2) * \frac{V_3}{V_2} + M_3;$$

Wherein $M_2$ is a mean value of light intensity of pixels of the image of the target object in the third imaging mode, $M_3$ is a mean value of light intensity of pixels of the image of the target object in the fifth imaging mode, $V_2$ is variance of light intensity of pixels of the image of the target object in the third imaging mode, $V_3$ is variance of light intensity of pixels of the image of the target object in the fifth imaging mode, i is light intensity of pixels of the image of the target object in the third imaging mode.

Optionally, the making the luminance adjustment to the fourth feature template to obtain the fifth feature template according to corresponding relationship between light intensity of pixels of the image of the target object in the third imaging mode and light intensity of pixels of the image of the target object in the fifth imaging mode to which the luminance adjustment is made comprises:

making, according to the corresponding relationship between the light intensity of pixels of the image of the target object in the third imaging mode and light intensity of pixels of the image of the target object in the fifth imaging mode to which the luminance adjustment is made, luminance adjustment to the fourth feature template to obtain light intensity L'(x, y) of pixels of the fifth feature template:

$$L'(x,y)=D[L(x,y)]$$

wherein L(x, y) is light intensity of pixels of the fourth feature template, D[i] is light intensity of pixels of the image of the target object in the fifth imaging mode to which the luminance adjustment is made, i is light intensity of pixels of the image of the target object in the third imaging mode.

Optionally, the corresponding relationship may be presented by a mapping table, that is the mapping relationship of i and T[i]. The corresponding T[L(x, y)] can be found according to the light intensity L(x, y) of pixels of the first feature template and the mapping relationship, i.e. is the light intensity adjusted of pixels of the fourth feature template, which is light intensity L'(x, y) of pixels of the fifth feature template.

Thus, the fifth feature template not only maintains the original structure of the previous template, but also adapts new light conditions.

Optionally, the light intensity of pixels comprises a value of L channel of the image in Lab format, or a value of Y channel of the image in YUV format.

The above method enables a terminal in an automatic focusing process not to suspend automatic focus function to realize a function of constant automatic focusing when a switch happens between depth camera and non-depth camera or between depth picture taking mode and non-depth picture taking mode, and to increase adaptability to various picture taking mode for a picture taking device, particularly that to various exposure for the picture taking device, to make user interaction decreases and focus on the target object in time, accurately and efficiently to output constant satisfactory images or videos.

Figure 3:
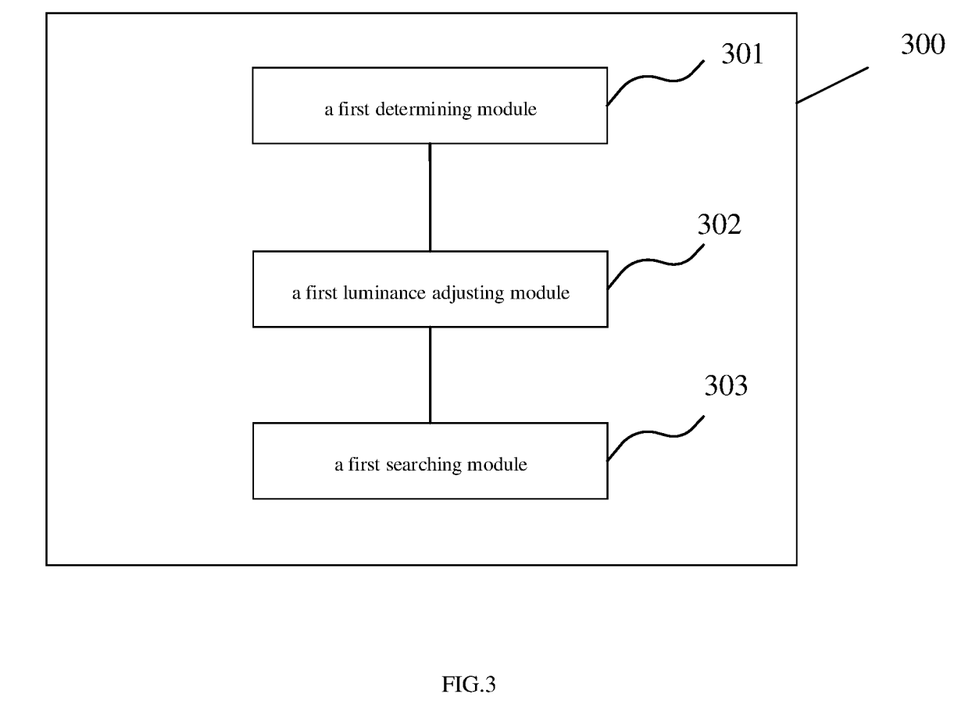
FIG. 3 is a structural diagram of an apparatus for focusing provided by the third embodiment of the present invention.

The following, referring to FIG. 3, is to illustrate an apparatus for focusing provided by the third embodiment of the present invention. The apparatus 300 may be applied in situation when exposure changes, and includes:

a first determining module 301, configured to determine that imaging mode switches from a first imaging mode to a second imaging mode, wherein exposure in the first imaging mode is different from exposure in the second imaging mode;

Optionally, the imaging mode switches from a first imaging mode to a second imaging mode may include flashlight on or off, or external light conditions change. Besides, the situation that affects exposure may include other situation in which quantity of light which illuminates light sensor through lens is affected.

Optionally, when the first imaging mode is that a color picture taking device takes a picture and the second imaging mode is that a black-white picture taking device takes a picture, or the first imaging mode is that a black-white picture taking device takes a picture or the second imaging mode is that a color picture taking device takes a picture.

a first luminance adjusting module 302, configured to make luminance adjustment to a first feature template of target object in the first imaging mode according to luminance information of an image of the target object in the first imaging mode and luminance information of an image of the target object in the second imaging mode to obtain a second feature template. Specifically, when exposure changes, for example when flashlight on, the image area of the target object after exposure changes is compared to that before exposure changes, relative feature of the tracking template is adjusted to adapt to new light conditions. The luminance information of the image of the target object in the second imaging mode may be determined by using stereoscopic vision to roughly estimate the position of the target object in the second imaging mode and obtaining its luminance information, or by using the luminance information of the entire image.

The image of the target object may be an image of a part of the target object, or that of the whole target object.

The feature template may be one or more, the feature template stores information, such as color information, shape information, texture information, etc.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, according to the luminance information, count the statistics information of light intensity of the image of the target object in the first imaging mode and statistics information of light intensity of the image of the target object in the second imaging mode, noted as $\{H_i^0, i=0 \ldots 255\}$, $\{H_i^1, i=0 \ldots 255\}$.

a first searching module 303, configured to search for an image of the target object according to the second feature template in the second imaging mode.

Optionally, the first luminance adjusting module 302 is specifically configured to making luminance adjustment to the first feature template of target object in the first imaging mode to obtain the second feature template according to following information:

statistics information of light intensity of pixels of the image of the target object in the first imaging mode and statistics information of light intensity of pixels of the image of the target object in the second imaging mode.

Optionally, the first luminance adjusting module 302 is specifically configured to determine corresponding relationship between the light intensity of pixels of the image of the target object in the first imaging mode and light intensity of pixels of the image of the target object in the first imaging mode to which the luminance adjustment is made according to statistics information of light intensity of pixels of the image of the target object in the first imaging mode and statistics information of light intensity of pixels of the image of the target object in the second imaging mode, wherein the statistics information of light intensity of pixels of the image of the target object in the first imaging mode to which the luminance adjustment is made is the same as or similar to the statistics information of light intensity of pixels of the image of the target object in the first imaging mode; and make luminance adjustment to the first feature template according to corresponding relationship between the light intensity of pixels of the image of the target object in the first imaging mode and light intensity of pixels of the image of the target object in the first imaging mode to which the luminance adjustment is made to obtain the second feature template.

Optionally, the first luminance adjusting module 302 is specifically configured to determine the corresponding relationship between the light intensity of pixels of the image of the target object in the first imaging mode and light intensity of pixels of the image of the target object in the first imaging mode to which the luminance adjustment is made according to following information:

a mean value of light intensity of pixels of the image of the target object in the first imaging mode and a mean value of light intensity of pixels of the image of the target object in the second imaging mode, and variance of light intensity of pixels of the image of the target object in the first imaging mode and variance of light intensity of pixels of the image of the target object in the second imaging mode; and, wherein the mean value of light intensity of pixels of the image of the target object in the first imaging mode to which the luminance adjustment is made is the same as or similar to the mean value of light intensity of pixels of the image of the target object in the first imaging mode, and variance of light intensity of pixels of the image of the target object in the first imaging mode to which the luminance adjustment is made is the same as or similar to the variance of light intensity of pixels of the image of the target object in the first imaging mode.

Optionally, the mean value may be a weighted mean value, and variance may be weighted variance. A person skilled in the art should understand, for different scenarios, the mean value and variance may be replaced by a variation of the calculating method of the present invention which does not need an inventive effort of a person skilled in the art, and falls into the protection scope of the present invention.

Optionally, the first luminance adjusting module 302 is specifically configured to determine, according to statistics information of light intensity of pixels of the image of the target object in the first imaging mode and statistics information of light intensity of pixels of the image of the target object in the second imaging mode, the light intensity T[i] of pixels of the image of the target object in the first imaging mode to which the luminance adjustment is made:

$$T[i] = (i - M_0) * \frac{V_1}{V_0} + M_1;$$

Wherein $M_0$ is a mean value of light intensity of pixels of the image of the target object in the first imaging mode, $M_1$ is a mean value of light intensity of pixels of the image of the target object in the second imaging mode, $V_0$ is variance of light intensity of pixels of the image of the target object in the first imaging mode, $V_1$ is variance of light intensity of pixels of the image of the target object in the second imaging mode, i is light intensity of pixels of the image of the target object in the first imaging mode.

Optionally, the first luminance adjusting module 302 is specifically configured to obtain, according to the corresponding relationship between the light intensity of pixels of the image of the target object in the first imaging mode and light intensity of pixels of the image of the target object in the first imaging mode to which the luminance adjustment is made, light intensity L'(x, y) of pixels of the second feature template:

$$L'(x,y)=T[L(x,y)]$$

wherein L(x, y) is light intensity of pixels of the first feature template, T[i] is light intensity of pixels of the image of the target object in the first imaging mode to which the luminance adjustment is made, i is light intensity of pixels of the image of the target object in the first imaging mode.

Optionally, the corresponding relationship may be presented by a mapping table, that is the mapping relationship of i and T[i]. The corresponding T[L(x, y)] can be found according to the light intensity L(x, y) of pixels of the first feature template and the mapping relationship, i.e. is the light intensity adjusted of pixels of the first feature template, which is light intensity L'(x, y) of pixels of the second feature template.

Thus, the second feature template not only maintains the original structure of the previous template, but also adapts new light conditions.

Optionally, the first searching module 303 is specifically configured to increase confidence level of a result of searching for the image of the target object from using a feature template that is independent of luminance in the second feature template, and/or, decrease confidence level of a result of searching for the image of the target object from using a feature template that depends on luminance in the second feature template. Specifically, in the process of searching for the image of the target object, the searching result is needed to be evaluated to judge if the current searching result can be trusted. It is judged that whether the current searching result is right by giving different weights to different feature templates (such as texture, color, gradient, intensity, etc.). The feature template irrelative to luminance may include gradient feature template, texture feature template, etc. The feature template relative to luminance may include color feature template, intensity feature template, etc. The method for increasing confidence level and decreasing confidence level may be realized by adjusting the weights of their confidence level, or by giving different thresholds to control confidence level of searching result for different feature templates.

Optionally, the light intensity of pixels comprises a value of L channel of the image in Lab format, or a value of Y channel of the image in YUV format.

Optionally, the first searching module 303 is further configured to search for the image of the target object by using the first feature template after a period of time. The period of time can be set, such as 3 seconds or 5 seconds, or set by an adaptive way by examining the exposure. For example, in a scenario of flashlight on or off, it may be set by 3 seconds. Within the period of time the second feature template is used to search for the image of the target object, and after the period of time the exposure like light conditions may become the original situation. If the exposure like light conditions may become the original situation, the first feature template may be still used to search for the image of the target object.

The above apparatus enables a terminal in an automatic focusing process not to suspend automatic focus function to realize a function of constant automatic focusing when exposure changes, and to increase adaptability to various picture taking mode for a picture taking device to make user interaction decreases and focus on the target object in time, accurately and efficiently to output constant satisfactory images or videos.

Figure 4:
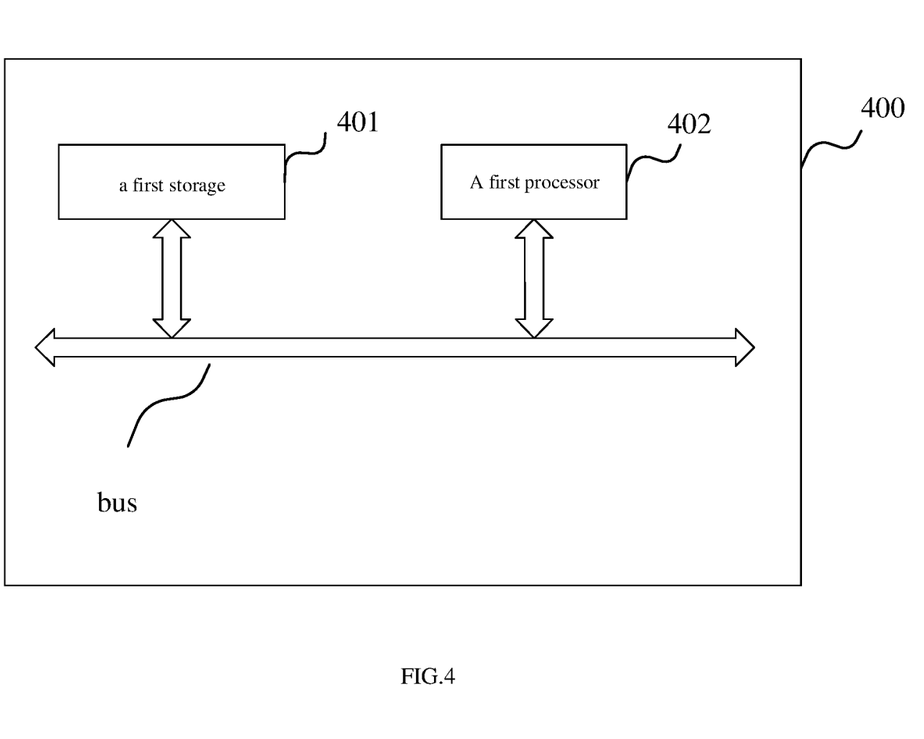
FIG. 4 is a structural diagram of an apparatus for focusing provided by the fourth embodiment of the present invention.

As shown in FIG. 4, an apparatus 400 for focusing is provided by the fourth embodiment of present invention, comprising a storage 401, a first processor 402 and computer instructions stored in the storage and executed by the processor, wherein the computer instructions are executed by the processor to perform steps of the method described in the first embodiment.

The above apparatus enables a terminal in an automatic focusing process not to suspend automatic focus function to realize a function of constant automatic focusing when exposure changes, and to increase adaptability to various picture taking mode for a picture taking device to make user interaction decreases and focus on the target object in time, accurately and efficiently to output constant satisfactory images or videos.

Figure 5:
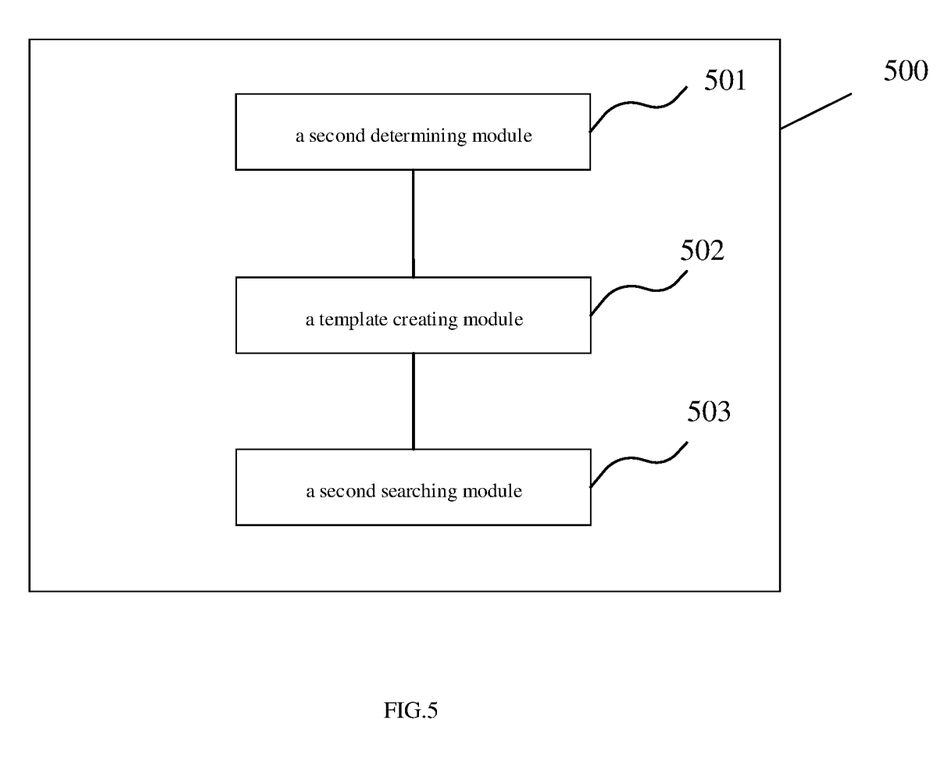
FIG. 5 is a structural diagram of an apparatus for focusing provided by the fifth embodiment of the present invention.

The following, referring to FIG. 5, is to illustrate an apparatus for focusing provided by the fifth embodiment of the present invention. The apparatus may be applied in the switch of dual-camera picture taking device including depth camera and non-depth camera, or in the switch of picture taking mode of the picture taking device including depth picture taking mode and non-depth picture taking mode. This embodiment of the present invention may be applied in a scenario of a switch from the non-depth camera to the depth camera, or switch from the non-depth camera to the depth camera and back to the non-depth camera.

The apparatus 500 includes:

a second determining module 501, configured to determine that imaging mode switches from a third imaging mode to a fourth imaging mode, wherein the third imaging mode comprises a mode in which a non-depth camera is used to take a picture, and the fourth imaging mode comprises a mode in which a depth camera is used to take a picture; The output image in the third imaging mode may be a grey-scale map or a color map.

a template creating module 502, configured to create a third feature template, wherein the third feature template is used to record depth information of a target object. Optionally, the third feature template is further used to record shape information of the target object. The feature template may be one or more, the feature template stores information, such as color information, shape information, texture information, etc.

a second searching module 503, configured to search for an image of the target object according to the third feature template in the fourth imaging mode.

the template creating module 502 is further configured to create the third feature template, wherein the third feature template is further used to record depth information and shape information of the target object.

the second searching module 503 is specifically configured to determine that the distance in depth between the target object and the background is more than or equal to a first threshold, and search for the image of the target object according to the depth information of the target object. The first threshold may be pre-set. The image of the target object may be an image of a part of the target object, or that of the whole target object.

the second searching module 503 is specifically configured to search for the image of the target object according to a first algorithm, wherein the first algorithm comprises: front background segmentation algorithm or Mean Shift algorithm.

Optionally, the second searching module 503 is further configured to search for the image of the target object by using a fourth feature template in the third imaging mode;

Optionally, the second determining module 501 is further configured to determine that the imaging mode switches from a fourth imaging mode to a fifth imaging mode, wherein the exposure in the fifth imaging mode is different from the exposure in the third imaging mode, and the fifth imaging mode and the third imaging mode are the modes of the same camera's; When there is only one picture taking device, and the picture taking device has depth picture taking mode and non-depth picture taking mode, the fifth imaging mode is the same as the third imaging mode, and both may be non-depth picture taking mode.

Optionally, wherein the apparatus 500 further comprises a second luminance adjusting module, and the second luminance adjusting module is configured to make luminance adjustment to the fourth feature template to obtain a fifth feature template; and the second searching module 503 is further configured to search for the image of the target object by using the fifth feature template in the fifth imaging mode.

Optionally, the second luminance adjusting module is specifically configured to make, according to luminance information of the image of the target object in the third imaging mode and luminance information of the image of the target object in the fifth imaging mode, luminance adjustment to the fourth feature template to obtain the fifth feature template.

Optionally, the luminance information may be obtained as following: change a format of a grey-scale map or a color map to that of Lab or YUV format which can separate luminance information and color information, where L or Y channel is the luminance information of the grey-scale map or the color map. When processing the luminance information, a channel related to the luminance, such as L or Y channel, can be processed.

Optionally, according to the luminance information, count the statistics information of light intensity of the image of the target object in the first imaging mode and statistics information of light intensity of the image of the target object in the second imaging mode, noted as $\{H_i^0, i=0 \ldots 255\}$, $\{H_i^1, i=0 \ldots 255\}$.

Optionally, the second luminance adjusting module is specifically configured to make luminance adjustment to the fourth feature template to obtain the fifth feature template according to the following information:

statistics information of light intensity of pixels of the image of the target object in the third imaging mode and statistics information of light intensity of pixels of the image of the target object in the fifth imaging mode.

Optionally, the second luminance adjusting module is specifically configured to determine corresponding relationship between light intensity of pixels of the image of the target object in the third imaging mode and light intensity of pixels of the image of the target object in the fifth imaging mode to which the luminance adjustment is made according to statistics information of light intensity of pixels of the image of the target object in the third imaging mode and statistics information of light intensity of pixels of the image of the target object in the fifth imaging mode, wherein statistics information of light intensity of pixels of the image of the target object in the fifth imaging mode to which the luminance adjustment is made is the same as statistics information of light intensity of pixels of the image of the target object in the third imaging mode; and, make luminance adjustment to the fourth feature template to obtain the fifth feature template according to corresponding relationship between light intensity of pixels of the image of the target object in the third imaging mode and light intensity of pixels of the image of the target object in the fifth imaging mode to which the luminance adjustment is made.

Optionally, the second luminance adjusting module is specifically configured to determine corresponding relationship between light intensity of pixels of the image of the target object in the third imaging mode and light intensity of pixels of the image of the target object in the fifth imaging mode to which the luminance adjustment is made according to the following information:

a mean value of light intensity of pixels of the image of the target object in the third imaging mode and a mean value of light intensity of pixels of the image of the target object in the fifth imaging mode, and variance of light intensity of pixels of the image of the target object in the third imaging mode and variance of light intensity of pixels of the image of the target object in the fifth imaging mode; and wherein the mean value of light intensity of pixels of the image of the target object in the fifth imaging mode to which the luminance adjustment is made is the same as or similar to the mean value of light intensity of pixels of the image of the target object in the third imaging mode, and variance of light intensity of pixels of the image of the target object in the fifth imaging mode to which the luminance adjustment is made is the same as or similar to the variance of light intensity of pixels of the image of the target object in the third imaging mode.

Optionally, the mean value may be a weighted mean value, and variance may be weighted variance. A person skilled in the art should understand, for different scenarios, the mean value and variance may be replaced by a variation of the calculating method of the present invention which does not need an inventive effort of a person skilled in the art, and falls into the protection scope of the present invention.

Optionally, the second luminance adjusting module is specifically configured to determine, according to statistics information of light intensity of pixels of the image of the target object in the third imaging mode and statistics information of light intensity of pixels of the image of the target object in the fifth imaging mode, the light intensity D[i] of pixels of the image of the target object in the fifth imaging mode to which the luminance adjustment is made:

$$D[i] = (i - M_2) * \frac{V_3}{V_2} + M_3;$$

Wherein $M_2$ is a mean value of light intensity of pixels of the image of the target object in the third imaging mode, $M_3$ is a mean value of light intensity of pixels of the image of the target object in the fifth imaging mode, $V_2$ is variance of light intensity of pixels of the image of the target object in the third imaging mode, $V_3$ is variance of light intensity of pixels of the image of the target object in the fifth imaging mode, i is light intensity of pixels of the image of the target object in the third imaging mode.

Optionally, the second luminance adjusting module is specifically configured to make, according to the corresponding relationship between the light intensity of pixels of the image of the target object in the third imaging mode and light intensity of pixels of the image of the target object in the fifth imaging mode to which the luminance adjustment is made, luminance adjustment to the fourth feature template to obtain light intensity L'(x, y) of pixels of the fifth feature template:

$$L'(x,y)=D[L(x,y)]$$

wherein L(x, y) is light intensity of pixels of the fourth feature template, D[i] is light intensity of pixels of the image of the target object in the fifth imaging mode to which the luminance adjustment is made, i is light intensity of pixels of the image of the target object in the third imaging mode.

Optionally, the corresponding relationship may be presented by a mapping table, that is the mapping relationship of i and T[i]. The corresponding T[L(x, y)] can be found according to the light intensity L(x, y) of pixels of the first feature template and the mapping relationship, i.e. is the light intensity adjusted of pixels of the fourth feature template, which is light intensity L'(x, y) of pixels of the fifth feature template.

Optionally, the light intensity of pixels comprises a value of L channel of the image in Lab format, or a value of Y channel of the image in YUV format.

The above apparatus enables a terminal in an automatic focusing process not to suspend automatic focus function to realize a function of constant automatic focusing when a switch happens between depth camera and non-depth camera or between depth picture taking mode and non-depth picture taking mode, and to increase adaptability to various picture taking mode for a picture taking device, particularly that to various exposure for the picture taking device, to make user interaction decreases and focus on the target object in time, accurately and efficiently to output constant satisfactory images or videos.

Figure 6:
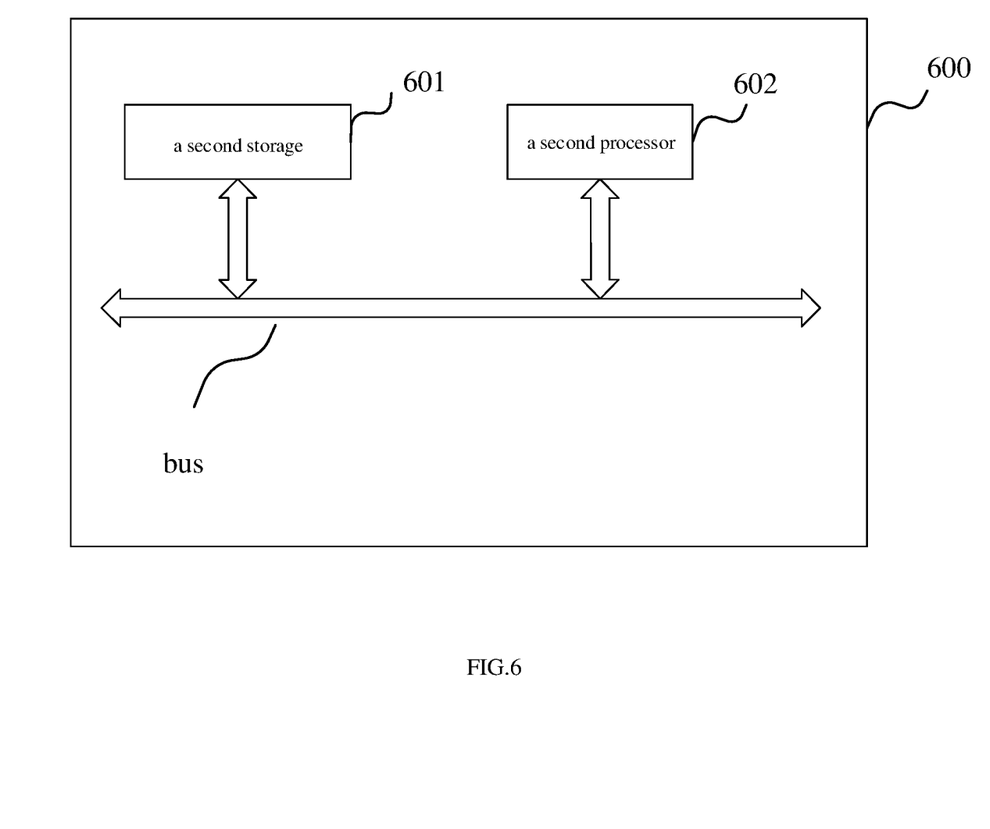
FIG. 6 is a structural diagram of an apparatus for focusing provided by the sixth embodiment of the present invention.

Optionally, as shown in FIG. 6, an apparatus 600 for focusing is provided in the sixth embodiment of the present invention, comprising a second storage 601, a second processor 602 and computer instructions stored in the storage and executed by the processor, wherein the computer instructions are executed by the processor to perform steps of the method described in the second embodiment.

The above method enables a terminal in an automatic focusing process not to suspend automatic focus function to realize a function of constant automatic focusing when a switch happens between depth camera and non-depth camera or between depth picture taking mode and non-depth picture taking mode, and to increase adaptability to various picture taking mode for a picture taking device, particularly that to various exposure for the picture taking device, to make user interaction decreases and focus on the target object in time, accurately and efficiently to output constant satisfactory images or videos.

For example, the computer instructions may be separated to form one or more modules/units, the one or more modules/units are stored in the storage, and executed by the processor to complete the present invention. The one or more modules/units may be computer instructions segments that can achieve a particular function, and the computer instructions segments are used to describe a process that the computer instructions are executed in the device/terminal.

The device/terminal may be computing device including cellphone, pad, desk computer, laptop, Personal Digital Assistant, cloud server, etc. The device/terminal may further include, but not limited to, a processor or storage. A person skilled in the art can understand the diagram of the present invention is only an example of the device/terminal, and not a limitation of the device/terminal. The device/terminal can include more or less parts than what is shown in the diagram, or combination of some parts, or different parts. For example, the device/terminal can include input equipment, output equipment, network access equipment, or bus etc.

The processor may be a central processing unit (CPU), another general processor, a digital signal processor (DSP), an application specific integrated circuit (ASIC), a field-programmable gate array (FPGA) or another programmable logical component, a discrete components gate, a transistor logical component, or a discrete hardware component. The general processor may be a micro-processor or another regular processor. The processor is the control center of the device/terminal, connecting each part of the device/terminal by using different interfaces and circuits.

The storage may be used to store the computer instructions and/or a module, the processor realize various function of the device/terminal by executing the computer instructions and/or module stored in the storage and invoking data stored in the storage. The storage may include an instruction sector and a data sector, where the instruction sector may store operating system, an application program for achieving at least one function (for example a picture viewing function) etc. Besides, the storage may include a high speed random access memory, or a nonvolatile memory, such as hard drive, memory, plug in hard drive, smart media card (SMC), secure digital (SD) card, flash card, at least one disk, flash element, or other volatile solid state storage.

The modules/units integrated in the device/terminal may be stored in a computer-readable medium when modules/units are realized in a form of a software function unit, and sold or used as an independent product. Based on this understanding, when realizing the present invention, a part or all of the procedure in the method of the above embodiment may be completed by computer instructions instructing a relative hardware, where the computer instructions are stored in a computer-readable medium, when executed by a processor, cause the processor to perform steps of any of the above method embodiments. The computer instructions include computer program codes, and the computer program codes may be a form of a source code, an object code, an .exe file, or some middle status. The computer-readable medium may include: an entity or device carrying the computer program codes, a recording medium, a USB stick, a mobile hard disk, a magnetic disc, a compact disc, computer storage, read-only memory (ROM), random access memory (RAM), electrical carrier signal, telecommunication signal, or a software distributing medium.

The image of the target object in any of the above embodiments may be an image of a part of the target object, or that of the whole target object. An image of a part of the target object, or that of the whole target object, or a variation of the image of the part of the target object or the whole target object is subject to the method or apparatus provided by the present invention, where the variation does not need an inventive effort of a person skilled in the art, and falls into a protection scope of the present invention.

What is claimed is:

1. A method for focusing, comprising:
    determining that imaging mode switched from a first imaging mode to a second imaging mode, wherein the first imaging mode and the second imaging mode have different exposures;
    making illumination adjustment to a first feature template of a target object in the first imaging mode according to first illumination information of the target object in the first imaging mode and second illumination information of the target object in the second imaging mode to obtain a second feature template;
    searching for the target object according to the second feature template in the second imaging mode.

2. The method according to claim 1, wherein the second imaging mode has an exposure that changes when a flashlight is on.

3. The method according to claim 1, wherein the making illumination adjustment to the first feature template of the target object in the first imaging mode to obtain the second feature template is based on (1) statistics of pixel light intensity of the target object in the first imaging mode and (2) statistics of pixel light intensity of the target object in the second imaging mode.

4. The method according to claim 3, wherein the making illumination adjustment to the first feature template of the target object in the first imaging mode to obtain the second feature template further comprises:
    determining a corresponding relationship between (1) pixel light intensity of the target object in the first imaging mode and (2) pixel light intensity of the target object in the first imaging mode after the illumination adjustment according to (a) the statistics of pixel light intensity of the target object in the first imaging mode and (b) the statistics of pixel light intensity of the target object in the second imaging mode, wherein (i) statistics of pixel light intensity of the target object in the first imaging mode after the illumination adjustment is the same as (ii) the statistics of pixel light intensity of the target object in the first imaging mode;
    making illumination adjustment to the first feature template to obtain the second feature template according to the corresponding relationship.

5. The method according to claim 4, wherein the determining the corresponding relationship is made according to following information:
    a mean value of the pixel light intensity of the target object in the first imaging mode and a mean value of the pixel light intensity of the target object in the second imaging mode, and
    a variance of the pixel light intensity of the target object in the first imaging mode and a variance of the pixel light intensity of the target object in the second imaging mode; and,
    wherein the mean value of the pixel light intensity of the target object in the first imaging mode after the illumination adjustment is the same as the mean value of the pixel light intensity of the target object in the first imaging mode, and the variance of the pixel light intensity of the target object in the first imaging mode after the illumination adjustment is the same as the variance of the pixel light intensity of the target object in the first imaging mode.

6. The method according to claim 4, wherein the determining the corresponding relationship comprises:
    determining, according to the statistics information of pixel light intensity of the target object in the first imaging mode and in the second imaging mode, light intensity T[i] of pixels of the target object in the first imaging mode after the illumination adjustment:

$$T[i] = (i - M_0) * \frac{V_1}{V_0} + M_1;$$

wherein $M_0$ is the mean value of the pixel light intensity of the target object in the first imaging mode, $M_1$ is the mean value of the pixel light intensity of the target object in the second imaging mode, $v_0$ is the variance of the pixel light intensity of the target object in the first imaging mode, $v_1$ is the variance of the pixel light intensity of the target object in the second imaging mode, and i is light intensity of pixels of the target object in the first imaging mode.

7. The method according to claim 6, wherein the making illumination adjustment to the first feature template according to the corresponding relationship comprises:

obtaining, according to the corresponding relationship, pixel light intensity L'(x, y) of the second feature template:

$$L'(x,y)=T[L(x,y)]$$

wherein L(x, y) is light intensity of pixels of the first feature template, T[i] is the light intensity of pixels of the target object in the first imaging mode after the illumination adjustment, i is the light intensity of pixels of the target object in the first imaging mode.

8. The method according to claim 7, wherein the light intensity of the pixels of the target object in the first imaging mode before or after the illumination adjustment comprises a L channel value in Lab format or a Y channel value in YUV format.

9. The method according to claim 1, wherein the searching for the image of the target object according to the second feature template in the second imaging mode comprises:
increasing a first confidence in a first search result for the target object from using an illumination-intendent feature template in the second feature template, or,
decreasing a second confidence in a second search result for the target object from using an illumination dependent feature template in the second feature template.

10. The method according to claim 1, further comprising searching for the image of the target object by using the first feature template after a period of time.

11. An apparatus for focusing, comprising:
a processor,
and a memory, coupled to the processor, storing computer instructions, wherein the computer instructions are executed by the processor to perform steps of claim 1.

* * * * *